Oct. 17, 1939.  R. J. BRITTAIN, JR  2,176,244

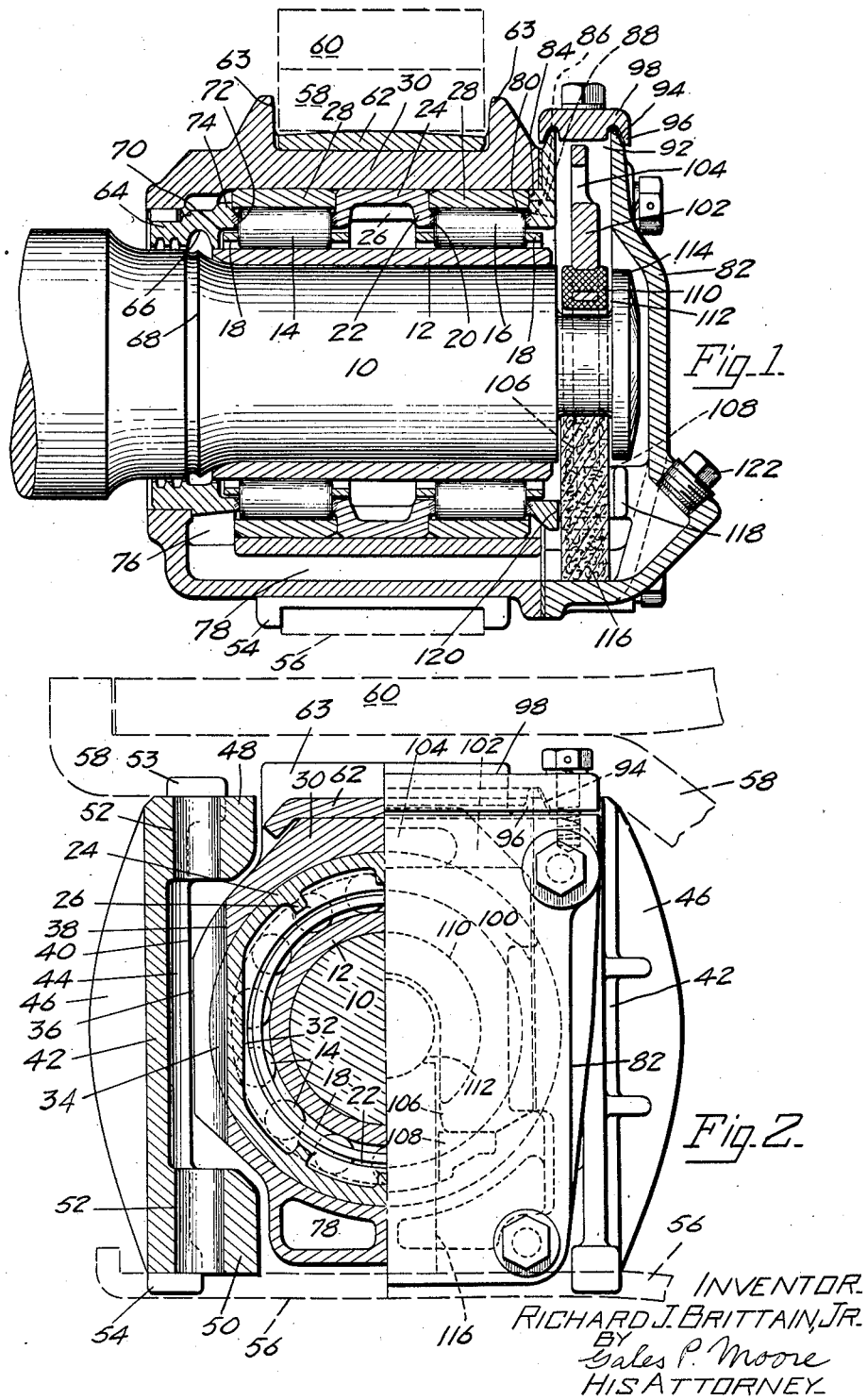

JOURNAL BOX

Filed May 19, 1936  2 Sheets-Sheet 2

INVENTOR
RICHARD J. BRITTAIN, JR.
BY Gales P. Moore
HIS ATTORNEY

Patented Oct. 17, 1939

2,176,244

UNITED STATES PATENT OFFICE 2,176,244

JOURNAL BOX

Richard J. Brittain, Jr., Bloomfield, N. J., assignor to General Motors Corporation, Detroit, Mich., a corporation of Delaware Application May 19, 1936, Serial No. 80,575

15 Claims. (Cl. 105—218)

This invention relates to journal boxes and comprises all of the features of novelty herein disclosed. An object of the invention is to provide a journal box having improved means for mounting it with respect to a frame, especially for selfaligning movement. Another object is to provide a journal box mounting wherein continuous pedestal securing bolts may be placed at the standard distance without thereby necessitating small sized anti-friction bearings for the axle and without resulting in leakage of oil from the box. Another object is to provide an improved construction for transmitting thrust from an axle to a journal box. Another object is to provide improved means for journalling a shaft in a housing.

To these ends and also to improve generally upon devices of this character the invention consists in the various matters hereinafter described and claimed. In its broader aspects, the invention is not necessarily limited to the specific construction selected for illustrative purposes in the accompanying drawings in which Fig. 1 is a vertical central section taken longitudinally of the journal box.

Fig. 2 is an end view of the box with one-half in central cross section.

Figure 3:
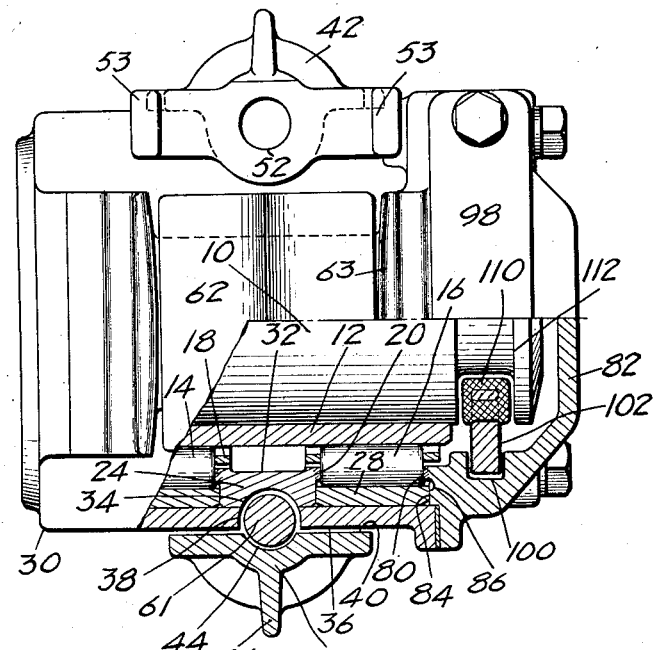
Fig. 3 is a plan view with a portion cut away and in horizontal section.
Figure 4:
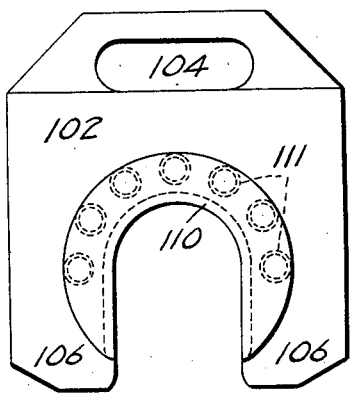
Fig. 4 is a side elevation of a thrust block.
Figures 5, 6:
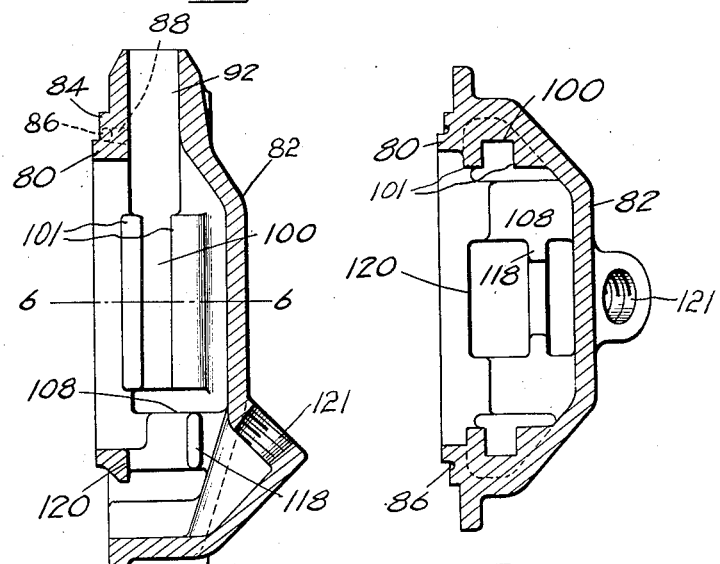
Fig. 5 is a vertical central section of an end cap.
Fig. 6 is a horizontal section on the line 6—6 of Fig. 5.

The numeral 10 indicates a shaft or axle on which is pressed a raceway sleeve 12 for two separate rows of roller bearings 14 and 16, each having a separator 18 in the form of a plain cylindrical band with openings for the rollers, such band lying inside of what may be termed the pitch circle of the rollers. Annular hardened projections or flanges 20 are adapted to engage the ends of the rollers and limit endwise movement thereof, the flanges 20 being formed on circular projections 22 extending inwardly from a spacing ring or sleeve 24 and being connected to the latter and to each other by bracing ribs or webs 26. The spacing sleeve is interposed between a pair of outer raceway sleeves 28 fitting in the bore of a housing or journal box 30, and the flanges 20 enter the ends of these sleeves outside of the separator 18. The sides of the sleeve 24 are internally thickened somewhat and are internally flat as indicated at 32 in Figs. 2 and 3, the central side portions of the sleeve being externally provided with arcuate recesses 34 for clamping bolts as will appear. Each side 36 of the box is slabbed off flat and at the central area is provided with a laterally open vertical recess or opening 38 which registers with the recess 34 of the sleeve. The notching of the box and the ring allows the use of larger bearings for a box of given width. Opposed to and slightly spaced from the flattened sides 36 of the box are flattened faces 40 on U-shaped spacers or dummy pedestals 42, each pedestal being centrally provided internally with an arcuate recess 44 and being provided externally with a bracing web 46. The recesses 34, 38 and 44 are curved about a common center to provide a vertical bolt opening. Leakage of lubricant from the box through the recess 38 is prevented by the spacing sleeve or ring 24 which is pressed into the bore of the box between the outer race sleeves 28. The side walls of the box are peripherally continuous and unbroken at the front and rear of the vertically elongated openings or recesses 38. The side walls are flattened at 36 and are normally spaced from the flattened faces 40 of the pedestals which project laterally to the front and rear of the box openings. The sleeve 24 fits within the box and extends horizontally across the box openings or recesses 38 and reinforces the box.

The dummy pedestals 42 have upper lugs 48 and lower lugs 50 extending laterally from an intermediate portion to partly enclose the box, the lugs being provided with bolt holes 52 in concentric alignment with the recess 38 in the box but of smaller radius. The lug 48 has a pair of spaced ears 53 and the lower lug 50 has a pair of spaced ears 54, the latter straddling a tie-member 56 indicated in broken lines and being a portion of the frame of an ordinary arch-bar truck. The lugs 53 straddle an intermediate tie member 58 on which is supported a top tie member 60. It will be understood that these tie members are all secured rigidly together and to the dummy pedestals by continuous long bolts 61 (Fig. 3) passed vertically through such parts. The bolts have clearance with the recesses 34 and 38 to permit self-alignment between the box and the frame. The bolts are spaced apart the standard distance to permit interchangeability with a plain bearing box of standard width.

The intermediate tie member 58 may directly engage the top of the box but it is preferred to interpose a seat plate 62 inserted in a cross recess between lugs 63 extending upwardly from the top of the box. The seat plate is preferably crowned longitudinally with respect to the axle and the lugs 63 are likewise crowned in a vertical plane both laterally and longitudinally of the box to provide for limited selfalignment between the frame and the box.

The inner or rear end of the box is closed by a sealing bushing 64 provided with grease grooves at the shaft and having an internal oil collecting groove 66 receiving oil thrown off from a rib 68 on the axle. The bushing is provided also with an internal recess 70 receiving the end of the adjacent separator 18. An annular projection or flange 72 is adapted to engage the ends of the rollers 14, such projection lying between the separator and the end of the adjacent raceway sleeve 28. The bushing also has an outwardly projecting rib 74 forming an abutment for the adjacent raceway sleeve 28. At the bottom, lubricant working laterally from the rollers can drop through a notch 76 into a lubricant reservoir 78.

At the outer or front end of the box an annular projection or flange 80 on an end cap 82 is adapted to engage the ends of the rollers 16 and limits endwise movement thereof. Endwise movement of the rollers is limited by the flanges 20, 72 and 80 so that each separator merely spaces the rollers. The cap also has an abutment face 84 engaging the adjacent end of the raceway sleeve 28 and fitting externally in the bore of the box. By applying endwise pressure to the bushing 64, which can pass through the box from end to end, the abutment lug 74 will cause the raceway sleeves 28 and the interposed spacing sleeve 24 and the end cap to be stripped from the bore of the box. Just outside of the projection 80 which is spaced a little from the raceway sleeve 28, the end cap is provided with arcuate oil collecting grooves 86 which communicate near the top with ports 88 whereby oil working away from the rollers 16 will be first conducted circumferentially and then deflected laterally through a port 88 to drop upon and provide lubrication for a thrust block as will appear. The end cap 82 is provided at the top with an opening 92 between the upwardly extending bevel lips 94 which fit in recesses having bevel lips 96 on a cover or lid 98 which is bolted to the end cap.

The end cap is internally provided at the sides with spaced vertical projections or guide ribs 101 forming upwardly open grooves 100 in alignment with the opening 92 and adapted to receive the side portions of a thrust plate or block 102 which is inserted downwardly through the opening 92. The thrust block is provided with an upwardly extending projection having a hand hole 104 to facilitate removal and its side portions substantially fit in the grooves 100 for easy sliding movement without substantial play. The thrust block is forked to straddle the axle and its downwardly extending legs 106 rest on spaced supporting lugs 108 projecting from the interior of the end cap. The thrust block has a central babbitted lining 110 cast through holes 111 thereof and contained within a groove 112 of the axle just inside of a terminal collar 114 thereon. The lining clears the bottom of the groove and the sides but will engage the sides to thereby limit endwise movement of the axle in two directions. When the axle is in a neutral or central position, its groove is in alignment with the opening 92 and the guide grooves 100. A supply of lubricant is received by the lining from the above mentioned port 88. An additional supply of lubricant is supplied to the axle groove and thrust block by a wick 116 which extends from the bottom of the end cap to the axle groove, the wick extending between a pair of lugs 118 and a rib 120 and being confined laterally by the lugs 108. Lubricant is supplied to the end cap and the communicating box through an opening 121 closed by a screw plug 122.

I claim:

1. In a device of the character described, a journal box having a vertically elongated opening breaking through its side wall, a ring fitting in the box and having a side wall closing the opening in the box, the side wall of the ring having a vertically extending outwardly open recess in vertical alignment with the opening, a frame supported by the box, and a frame securing member received in the recess substantially as described.

2. In a device of the character described, a journal box having an opening in its side wall, a ring fitting in the box and having a side wall closing said opening, the side wall being internally thickened, and the side portion having an external recess in line with the opening; substantially as described.

3. In a device of the character described, a journal box having a vertically elongated opening breaking through its side wall, a ring fitting in the box and having a side wall extending horizontally across and closing the opening in the box, the side wall of the ring having a vertically extending outwardly open recess opposite to the opening, the side wall of the box having outwardly open recesses above and below the opening, the outwardly open recesses in the box and in the ring having curved walls in substantial alignment vertically of the box, and a frame securing member in said recesses; substantially as described.

4. In a device of the character described, a journal box having a vertically elongated recess in the exterior of its side wall, the side wall being peripherally continuous and unbroken at the front and rear of the recess, a ring fitting the inner surface of the box opposite to the external recess to reinforce the box in the region of said recess, a frame supported by the box, a pedestal, a bolt adapted to connect the pedestal to the frame and extending lengthwise through the box recess, the bolt having clearance with the wall of the recess and the pedestal normally having clearance with the unbroken side wall of the box at the front and rear of the recess to provide for self-alignment between the box and the frame; substantially as described.

5. In a device of the character described, a journal box having an opening in its side wall, a ring fitting in the box and having a side wall closing the opening in the box, the side wall of the ring having an external recess in line with the opening, a pedestal member at the side of the box and having a vertical bolt opening in concentric alignment with the walls of the recess and the opening, and a frame securing bolt fitting in the bolt opening and having clearance with the box opening and the recess in the ring; substantially as described.

6. In a device of the character described, a journal box, a frame supported by the box for self-aligning movement, the sides of the box having laterally open vertical recesses and being flattened at opposite sides of the recess, pedestals at the opposite sides of the box and having side faces spaced from the flattened sides of the box at opposite sides of the box recess, and bolts for securing the pedestals to the frame, the bolts extending through the box recesses, the bolts lying between the pedestals and the walls of the recess and having clearance therewith; substantially as described.

7. In a device of the character described, a journal box having vertically elongated openings breaking through its side walls, raceway sleeves fitting in the box at opposite sides of the openings, a ring fitting the inner surface of the box between the sleeves and closing the box openings, the ring having external recesses facing the box openings, a frame supported by the box, frame securing members at opposite sides of the box and having portions traversing the box openings and the recesses in the ring, said members being spaced apart a shorter distance than the external diameter of the raceway sleeves; substantially as described.

8. In a device of the character described, a journal box having vertically elongated openings breaking through its side walls, raceway sleeves fitting in the box at opposite sides of the openings, a ring fitting the inner surface of the box between the sleeves and closing the box openings, the ring having recesses facing the box openings, a frame, pedestals at opposite sides of the box and extended to the opposite sides of the box openings, and bolts for securing the pedestals to the frame, the bolts having portions received in the box openings and in the recesses of the ring, said portions being spaced apart a shorter distance than the external diameter of the raceway sleeves; substantially as described.

9. In a device of the character described, a journal box having vertically elongated recesses in its side walls, raceway sleeves fitting in the box at opposite sides of the recesses, a spacing ring fitting the inner surface of the box between the sleeves and reinforcing the box at the recesses, a frame, pedestals at opposite sides of the box, bolts for securing the pedestals to the frame, the bolts having portions received in the box recesses and spaced apart a shorter distance than the width of the box between the pedestals; substantially as described.

10. In a device of the character described, a journal box having vertically elongated openings through its side walls, raceway sleeves fitting in the box at opposite sides of the openings, a ring fitting the inner surface of the box between the sleeves and closing the box openings, the ring having outwardly open recesses in alignment with the elongated openings, a frame, pedestals at opposite sides of the box and having side faces spaced from the sides of the box at opposite sides of the box openings, bolts for securing the pedestals to the frame and having portions received in the box openings and in the recesses of the ring, and the bolts being spaced apart a shorter distance than the external diameter of the raceway sleeves; substantially as described.

11. In a device of the character described, a housing, a shaft, a pair of spaced raceway sleeves in the housing, rolling elements in two spaced rows between the shaft and the raceway sleeves, a ring spacing said sleeves apart, the ring having its end portions extending inwardly, and guide flanges projecting axially into the interior of the sleeves from said inwardly extending end portions; substantially as described.

12. In a device of the character described, a housing, a shaft, a pair of spaced raceway sleeves in the housing, rolling elements in two spaced rows between the shaft and the raceway sleeves, a ring spacing said sleeves apart, the ring having projections extending inwardly, ribs connecting said projections to the ring, and guide flanges extending axially from the projections to engage the rolling elements; substantially as described.

13. In a device of the character described, a journal box, a shaft, a pair of spaced raceway sleeves in the box, rolling elements between the shaft and the raceway sleeves, a ring spacing said sleeves apart, closure members for the ends of the box and each engaging a raceway sleeve, and one of said end closure members being of a size to pass through the box from one end to the other to strip the sleeves and their engaging members from the box, said end closure member itself closing the end of the box and being exposed at said end for such stripping; substantially as described.

14. In a device of the character described, a journal box, a shaft, a pair of spaced raceway sleeves in the box, rolling elements between the shaft and the raceway sleeves, a ring spacing the sleeves apart, a closure member for one end of the box and having a part abutting against the adjacent sleeve, and said end closure member comprising a ring adapted to be forced through the box from one end to the other to strip the sleeves and spacing ring therefrom, the closure ring itself closing the end of the box and having an annular surface exposed at said end for such stripping; substantially as described.

15. In a device of the character described, a journal box, a shaft, a raceway sleeve in the box, rolling elements between the shaft and the sleeve, detachable closure members for the ends of the box and each having an abutment in line with the raceway sleeve, and one of said closure members being a ring adapted to be forced through the box from one end to the other to strip the raceway sleeve and rolling elements therefrom, the ring itself closing the end of the box and having its annular outer surface exposed; substantially as described.

RICHARD J. BRITTAIN, Jr.